United States Patent [19]
Kawaguchi et al.

[11] Patent Number: 5,675,933
[45] Date of Patent: Oct. 14, 1997

[54] PLANT CULTIVATION BED AND PLANT CULTIVATION BLOCK

[76] Inventors: Tadashi Kawaguchi, 13-46, Mikuriyahigashi 2-chome, Higashiosaka-shi, Osaka; Naoya Kawaguchi, 11-4 Gakuenasahicho, Nara-shi, Nara, both of Japan

[21] Appl. No.: 636,293

[22] Filed: Apr. 23, 1996

[30] Foreign Application Priority Data

Oct. 12, 1995 [JP] Japan .................... 7-264038

[51] Int. Cl.⁶ .................... A01G 9/02
[52] U.S. Cl. ............... 47/65.8; 47/65.9; 47/86; 47/DIG. 13; 47/1.01; 47/59
[58] Field of Search ............ 47/59 CO, 1.01 F, 47/66 B, 66 S, DIG. 13

[56] References Cited

U.S. PATENT DOCUMENTS

| 4,287,682 | 9/1981 | Browne | 47/66 B |
| 4,299,056 | 11/1981 | Towning | 47/66 B |

FOREIGN PATENT DOCUMENTS

| 2220179 | 10/1974 | France | 47/1.01 F |
| 38-24525 | 11/1963 | Japan | 47/1.01 F |
| 51-27536 | 3/1976 | Japan | 47/65.9 |
| 2113939 | 9/1990 | Japan | 47/65.8 |
| 5041924 | 2/1993 | Japan | 47/65.9 |
| 6153688 | 6/1994 | Japan | 47/DIG. 13 |
| 2244988 | 12/1991 | United Kingdom | 47/DIG. 13 |
| 2252028 | 7/1992 | United Kingdom | 47/66 B |
| 5690 | 4/1992 | WIPO | 47/66 S |

OTHER PUBLICATIONS

The Florada Times Union, Feb. 16, 1994 copy in 47/Digest 13.

*Primary Examiner*—Henry E. Raduazo
*Attorney, Agent, or Firm*—Arnold B. Silverman; Eckert Seamans Cherin & Mellott, LLC

[57] ABSTRACT

The invention provides a cultivation medium promoting germination of plants and growth of the seedlings while precluding the plant from suffering damage from insect pests. The cultivation medium comprises a particulate, granular or fibrous rubber. Particulate, granular or fibrous pieces of plant or soil can further be incorporated into the medium. Seeds of a plant are sown on the cultivation medium or mixed with the medium for cultivating the plant.

9 Claims, 5 Drawing Sheets

PLANT CULTIVATION BED AND PLANT CULTIVATION BLOCK

BACKGROUND OF THE INVENTION

1. Technical Field

The present invention relates to plant cultivation media for germinating plants and raising the seedlings for the growth of the plants.

2. Prior Art

It is conventional practice to sow seeds of plants directly on ridges of soil serving as cultivation beds in which the plant is to be rooted and cover the seeds with soil for germinating the plant, raising the seedlings and growing the plant (hereinafter referred to as "cultivation").

It is important to maintain the cultivation bed at suitable temperatures for rapid germination of plants and promoted growth of the seedlings. For the control of temperature, it is conventionally necessary to cover the cultivation bed of soil or sand with a vinyl sheet or straw, or to make the cultivation bed within a greenhouse.

When plants are to be grown on the rooftop of a building or in an open ground covered with asphalt or concrete and having no soil for providing a cultivation bed, there arises a need to lay sand, soil or the like on the concrete surface. However, the soil will then scatter in the wind or flow away with rain to diminish in quantity or to clog up the ditch. Furthermore, the soil, if placed on the rooftop, is likely to impair the stability of the building owing to its weight.

The natural soil is likely to contain insect pests or eggs thereof, which need to be controlled when the soil is used for cultivating plants.

Plants, especially lawn grasses, grow with their roots intertwined in a complex fashion. It is known to prepare a lawn by planting the grass on a soil layer of about 3 cm in thickness to grow entangled roots, cutting the soil layer into about 30 cm square mats with the grass thereon and placing the grass mats on the soil of desired area. However, once the grass has been rooted after the placement, each grass mat is connected to the adjacent mat and to the soil by the roots, so that when the grass died locally, it is difficult to plant the grass for replacement or supplement.

SUMMARY OF THE INVENTION

We have focused attention on the fact that rubber as finely divided into particles, grains or fibrous pieces has the advantage of feeling soft, being bulky, becoming a lump like soil when pressed in the hand and yet being readily returnable to particles when the lump is collapsed. While rubber is higher than sand in specific heat and has a good heat retaining property, we have found that these characteristics are suitable for cultivating plants, rendering rubber very advantageous as a substitute for soil and sand for use in cultivating plants. We have directed attention further to the high water retentivity of plants as finely divided into particles, grains or fibrous pieces, and also to the fact that since no insect pests are parasitic on rubber, the use of rubber in cultivation eliminates the need for pest control.

An object of the present invention is to provide a method of cultivating plants with use of a cultivation medium which promotes germination of the plant and growth of the resulting seedlings while precluding the plant from suffering damage from insect pests.

Another object of the invention is to provide a cultivation medium comprising a particulate, granular or fibrous rubber (FIG. 1). A plant can be cultivated by mixing seeds of the plant with the cultivation medium. In addition to the rubber, particulate, granular or fibrous pieces of a plant and/or soil can be incorporated into the cultivation medium.

Another object of the invention is to provide a plant cultivation bed prepared by accommodating the cultivation medium and seeds of a plant in an air permeable bag (FIG. 2).

Another object of the invention is to provide a plant cultivation block comprising the cultivation bed and a box having the cultivation bed accommodated therein (FIG. 3 to 6). The box has a protective member on an upper side thereof formed with openings sufficient for the growth of sprouts and a lower side formed with through holes for drainage and air flow and projections, and is adapted to accommodate the cultivation bed therein. The protective member protects the sprouts and roots when the box Is treaded on by a person.

Still another object of the Invention Is to provide a plant cultivation module comprising a plurality of plant cultivation blocks which are connected together (FIG. 7). Each of the cultivation blocks can be connected to the block adjacent thereto by an attaching member.

DESCRIPTION OF THE PREFERRED EMBODIMENTS

Embodiment 1

The invention provides a cultivation medium comprising a particulate, granular or fibrous rubber. The rubber to be used is not limited in kind. Examples of rubbers usable are SBR (styrene-butadiene copolymer synthetic rubber), automotive tire rubbers and like synthetic resin rubbers and natural rubber. The method of preparing the particulate, granular or fibrous rubber Is not limited specifically either. It may be prepared by cutting the material rubber by an abrasive wheel, or by freezing the material rubber with liquid nitrogen and thereafter pulverizing the frozen rubber. The rubber thus prepared is particulate, granular or fibrous in shape. Although the size is variable over a wide dimensional range, the rubber, when particulate or granular, is preferably in the form of particles to grains up to about 5 mm in diameter. When fibrous, the rubber is up to about 0.8 mm in diameter and about 1 mm to about 10 mm in length. The fibrous rubber is then easy to handle and also suitable for the growth of roots of plants.

The particulate, granular or fibrous rubber only can be used for making the cultivation medium, or particulate, granular or fibrous pieces of plant and/or soil can be admixed with the rubber. Examples of preferred pieces of plants are fibrous pieces obtained by crushing or pulverizing plants such as coconut palm. Fabrics, sponges and like materials which are excellent in water absorbing property and water retentivity and which are made granular or fibrous can be mixed with the cultivation medium. Solid fertilizers can also be mixed with the medium.

In mixing pieces of plant and/or soil with the particulate, granular or fibrous rubber to prepare a cultivation medium, it is suitable that the medium contain at least about 10 vol. % of the rubber. From the viewpoint of heat retentivity and water retentivity, it is desired that at least about 30 vol. % of the rubber be present in the medium.

In the case where a fabric, sponge or like material is mixed with the rubber only or with the mixture of the rubber and plant pieces and/or soil, it is suitable that the fabric, sponge or the like be present in an amount of up to about 20 vol. %. Preferably, the amount is about 5 to about 10 vol. % in view of the water absorbing property and water retentivity of the medium.

Figure 1:
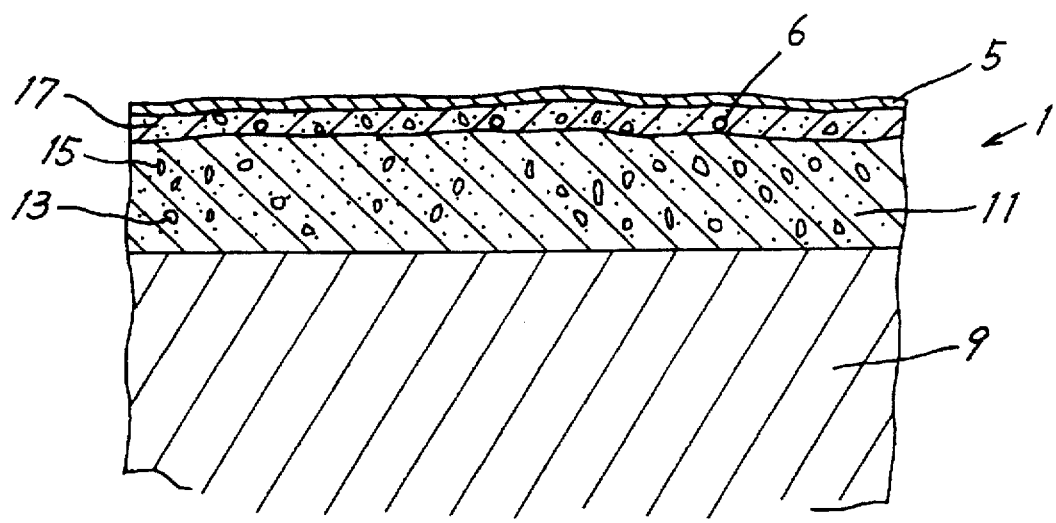
FIG. 1 is a sectional view showing an embodiment of cultivation medium as laid on concrete and seeded.

With reference to FIG. 1, a particulate, granular or fibrous rubber 11, plant pieces 13 and soil 15 are first mixed together into a cultivation medium 1, which is then made into a layer directly on concrete 9, soil or the like. Alternatively, the medium 1 can be used as packed in a case. After the cultivation medium 1 is seeded, a cover 17 of the same composition as the medium may be provided over the medium. Further as will be described later, the cultivation medium 1 is usable as wrapped in an air permeable fabric along with seeds 6 of a plant.

The plant to be cultivated in the cultivation medium 1 is not limited specifically in kind. For example, cultivation of plants can be started with seeds or bulbs. Cuttings can also be planted for cultivation.

Embodiment 1 will be described in detail with reference to the following example.

A granular rubber about 3 mm in grain size was mixed with a fibrous rubber about 0.8 mm in maximum diameter and about 5 mm to about 10 mm in length to prepare a cultivation medium, which was then packed to a thickness of about 4 cm into a case left open at its top and measuring 60 cm in the length of one side and 6 cm in height. Twenty seeds of radish were sown on the cultivation medium and covered with the same rubber mixture as the medium to a thickness of 0.5 cm. The case was placed outdoors for exposure to sunlight. During the experiment, the outdoor atmospheric temperature was about 30° C., and the weather was fair.

About 500 c.c. to about 700 c.c. of water was sprinkled on the cultivation medium from above the cover twice in the morning and evening. After about 40 hours, some seeds were found sprouting. Of the 20 seeds planted, 16 seeds germinated.

With the common cultivation bed of the prior art, the average germination time of radish seeds is 60 to 80 hours. This indicates that the time required for germination was at least about 20 hours shorter.

Embodiment 2

The embodiment to be described below is a cultivation bed 2 which is prepared by filling the foregoing cultivation medium into an air permeable bag.

Figure 2:
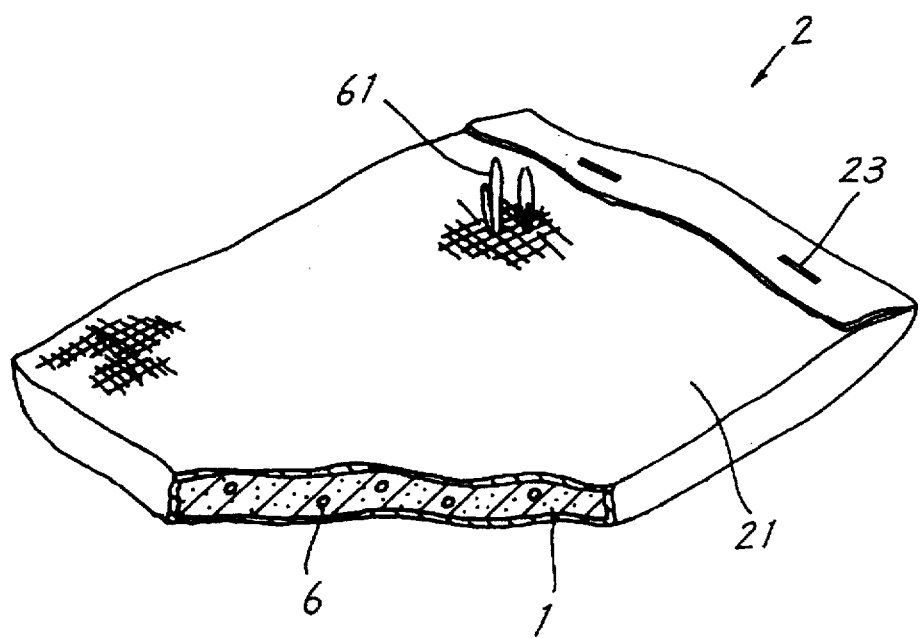
FIG. 2 is a perspective view of a cultivation bed prepared by filling the cultivation medium and seeds into an air permeable bag.

FIG. 2 shows a bag 21 which can be prepared from a material having high air permeability, such as air permeable nonwoven fabric resembling Japanese paper in hand or reticular fabric of fiber.

The bag 21 has an open end, through which the cultivation medium 1 of Embodiment 1 is filled in, and the filled bag 21 is spread out flatly so as to have a thickness of about 1 cm to about 5 cm. Seeds 6 of a plant are thereafter sown on the medium by hand inserted into the bag 21 through the opening, and the bag opening Is closed using staples or like fastening means 23 to obtain the cultivation bed 2 shown in FIG. 2.

The plant seeds 6 can be mixed with the medium 1 before the medium is filled into the bag.

A plurality of cultivation beds 2 thus constructed are arranged on concrete, asphalt or the like at a desired location of installation. The seeds can be germinated merely by sprinkling water on the beds. The germinated seeds sprout through air passage portions of the bag, while roots grow in the cultivation medium. Accordingly, plants can be readily cultivated in the absence of soil. Furthermore, the water retaining and heat retaining properties of the rubber enable the plant to grow more rapidly than when the soil is used for cultivation.

Especially lawn grasses originating in Europe are suited to cultivation on the bed 2 because the grass of European origin has sharp-pointed sprouts which easily grow through the air passage portions of the bag 21.

Embodiment 3

A cultivation block will be described which comprises a cultivation bed including a cultivation medium and seeds of grass or like plant and placed in a box.

More specifically stated with reference to FIG. 3, the cultivation block 4 shown comprises the cultivation bed 2 described with reference to Embodiment 2 and filled with a cultivation medium 1 along with seeds 6 of plant, and a box 41 accommodating the bed 2 therein.

Figure 3:
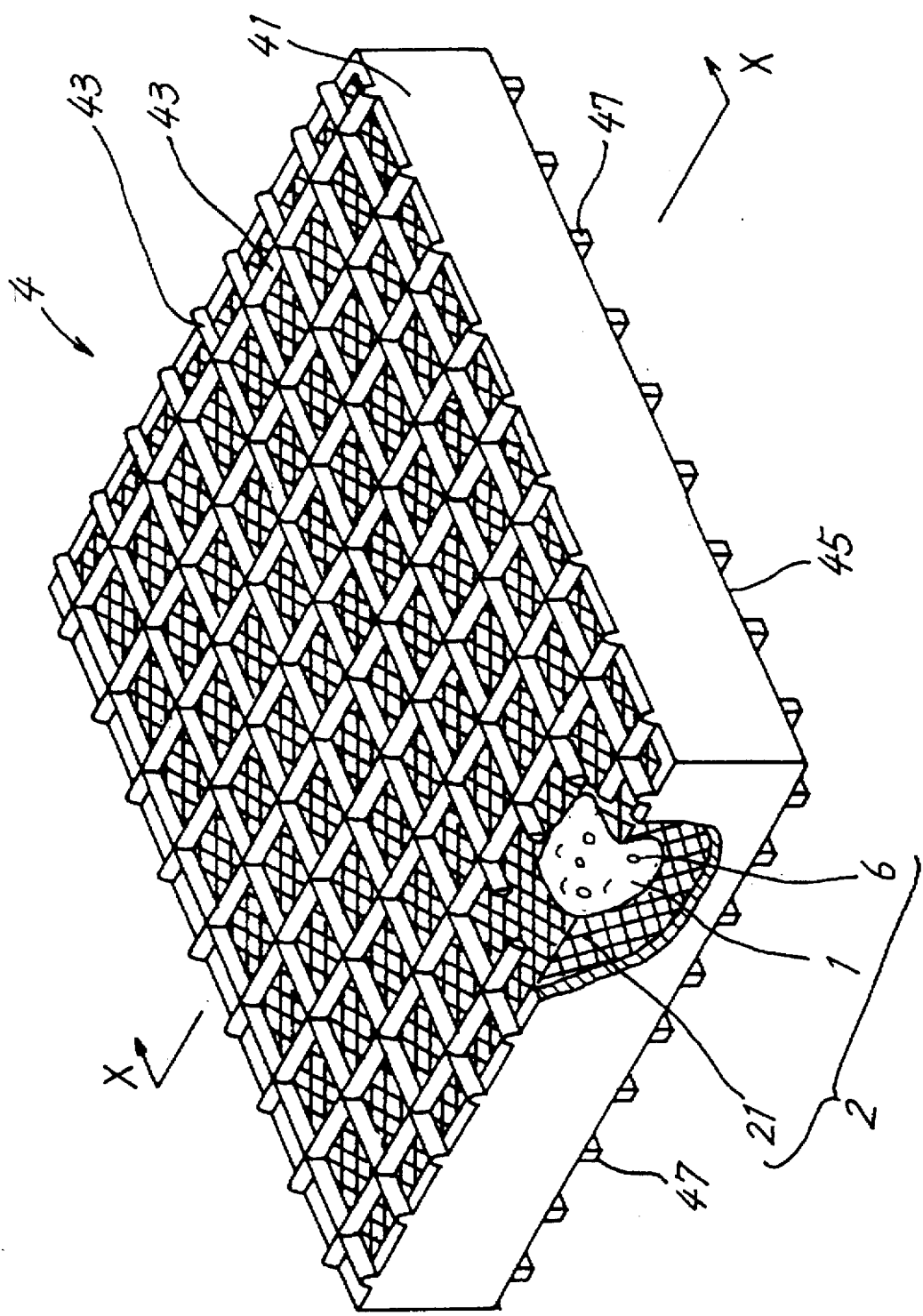
FIG. 3 is a perspective view of a cultivation block.
Figure 4:
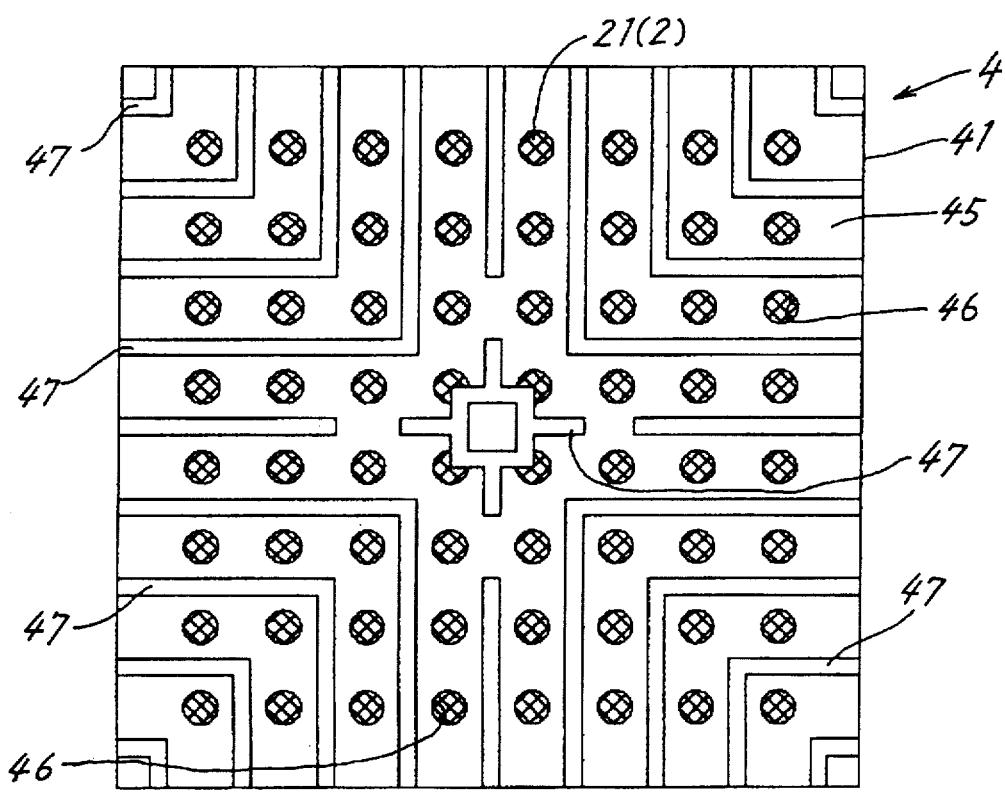
FIG. 4 is a bottom view of the cultivation block of FIG. 3.
Figure 5:
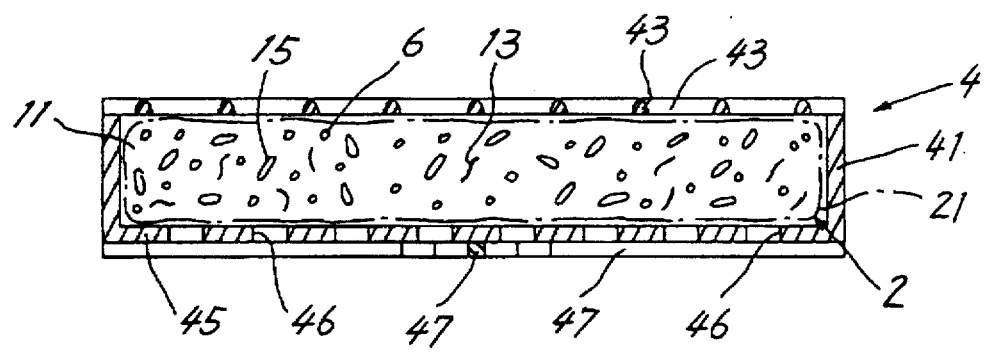
FIG. 5 is a view in section taken along the line X—X in FIG. 3 and showing the cultivation block as it is seen in the direction of arrows.

As shown in FIGS. 3 to 5, the box 41 has an open upper side which is provided with a protective member 43, and a bottom plate 45 formed with through holes 46 and downward projections 47. The box 41 is easy to handle when made of plastics and measuring about 20 cm to about 50 cm in the length of one side and about 2 cm to about 10 cm in height.

The protective member 43 on the upper side of the box 41 is formed with openings sufficient for the growth of sprouts when the plant seeds germinated, protects the sprouts and roots when the block 4 is treaded on by a person and prevents the clothes worn by the person sitting thereon from wetting or soiling when the cultivation medium 1 packed in the box 41 is wet with absorbed water.

At least one through hole 46 is formed in the bottom plate 45 of the box 41 for the passage of air and drainage.

The projections 47 projecting downward from the bottom plate 45 of the box 41 form a clearance between the box 41 and the ground surface, for example, of concrete when the box is placed on the ground to ensure efficient of passage of air and drainage through the holes 46. FIG. 4 shows the projections 47 provided as equidistantly spaced on the bottom plate 45 in order to preclude deformation of the box 41 when the block 4 is treaded on by persons. For use at locations where the block 4 will be subjected to no load, therefore, a rim can be formed along the outer periphery of the bottom plate 45 in place of the projections 47.

The number, size and shape of through holes in the bottom plate, as well as of projections thereon, are suitably variable.

The cultivation bed 2 shown in FIG. 2 and comprising a cultivation medium 1 filled in an air permeable bag 21 is placed in the box 41 thus constructed. It is desired that the bed 2 be slightly smaller than the box 41.

The cultivation bed 2 is placed into the box 41 before the protective member 4 or the bottom plate 45 is attached to the body of the box 41. The cultivation block 4 can be completed by attaching the protective member 43 or the bottom plate 45 thereafter. The protective member 43 or the bottom plate 45 can be attached, for example, by adhesion or high-frequency welding.

Figure 6:
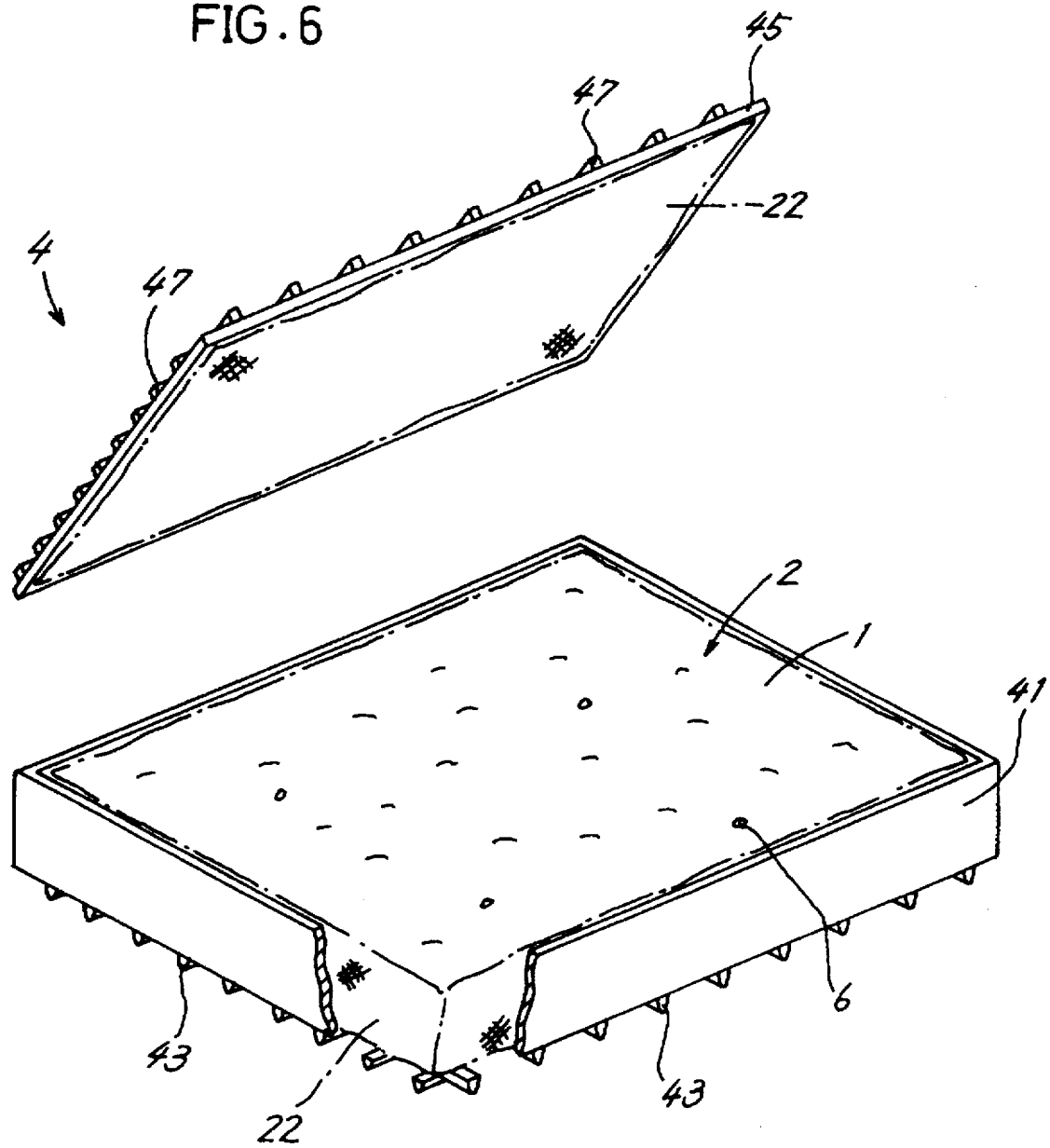
FIG. 6 is a perspective view partly broken away and showing a modified cultivation block according to Embodiment 3 as it is turned upside down with its bottom plate separated off.

FIG. 6 is a perspective view partly broken away and showing another cultivation block 4 embodying the invention. With this embodiment, the bottom plate 45 of a box 41 can be attached after a cultivation medium has been placed in. An air permeable fabric 22 such as a nonwoven fabric is affixed to protective member 43 and bottom plate 41 each on the inner surface of the box 41.

The cultivation medium 1 with seeds 6 of a plant mixed therewith is accommodated in the box 41. The plant cultivation block 4 can be completed by subsequently attaching the bottom plate 45 to the box 41. The plant seeds 6 and the cultivation medium 1 are wrapped in the air permeable fabric 22 and are therefore unlikely to spill from the box 41. Incidentally, the bottom plate 45 may be attached after sowing the plant seeds on the inner side of the air permeable fabric 22 lining the box and placing the cultivation medium into the box so as to cover the seeds.

Figure 8:
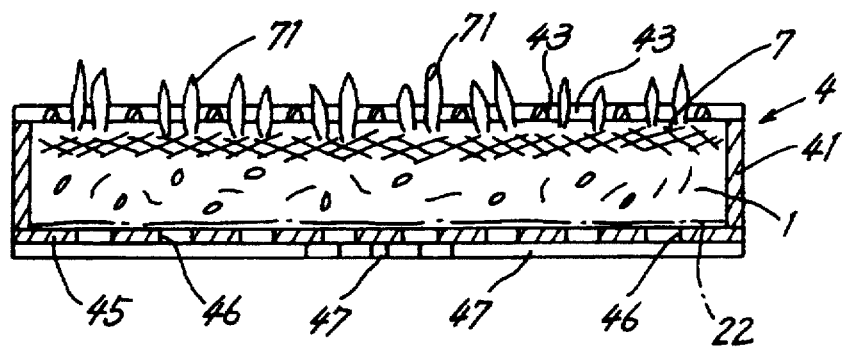
FIG. 8 is a perspective view of a cultivation block accommodating lawn grass mat.

As shown in FIG. 8, a conventional lawn grass mat 7 can be accommodated In the box 41 with no air permeable fabric affixed to the box side. The grass mat 7 Is formed by the grass 71, the roots thereof are intertwined complexly with each other. In this case; a block 4 can be prepared by cutting the grass mat 7 approximately to the same size as the box 41, placing the grass mat 7 with its grass side opposed to the protective member 43, filling the cultivation medium 1 Into a clearance between the grass mat 7 and the box 41 and attaching the bottom plate to the box with the air permeable fabric 22 affixed to the plate.

Figure 7:
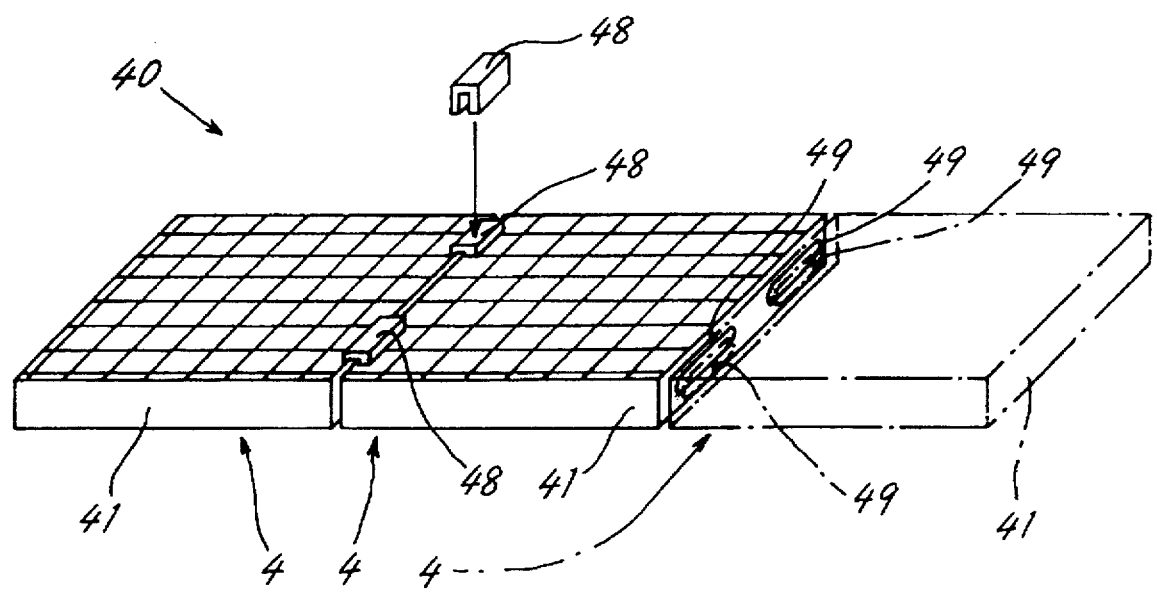
FIG. 7 is a perspective view of cultivation

In the case where a plurality of cultivation blocks 4 are arranged side by side at a desired site of installation, each block 4 is connected to the block 4 adjacent thereto by channel-shaped attaching members 48 at the adjoining box side walls as seen in FIG. 7 to provide an assembly of blocks 4 for use as a plant cultivation module 40. The individual blocks are then prevented from moving against deflection and made easy to handle. The attaching members 48 are not limited to channel-shaped members insofar as the adjacent blocks 4, 4 are thereby connectable. For example, bolts and nuts are usable as attaching members 48.

If the adjoining box side walls of the adjacent blocks 4, 4 are formed with respective apertures 49, 49 opposed to each other, growing roots will extend from one block 4 into the cultivation medium of the other block 4 adjacent thereto through the apertures 49, 49 as shown in FIG. 7, so that the blocks can be interconnected by the roots of the plant. The blocks thus connected by the roots can be readily disconnected by cutting the roots with a cutter knife or the like for separation.

The use of blocks of the invention for cultivating plants facilitates rearrangement of the blocks in accordance with the growth of the plant or replacement of blocks with a retarded growth.

The plant cultivation blocks of the invention are individually easy to carry. Accordingly, the plant need not be cultivated at the site of installation from the beginning, but the blocks can be arranged at the desired location of installation after the plant has been germinated to some extent. Further if different seeds are planted in different blocks, various patterns are readily available.

Apparently, the present invention can be modified and altered by one skilled in the art without departing from the spirit and scope of the invention. Such modifications and improvements are included within the scope of the invention as defined in the appended claims.

What is claimed is:

1. A plant cultivation block comprising:
    a plant cultivation bed comprising an air permeable bag, the air permeable bag containing a cultivation medium and seeds of a plant, the cultivation medium comprising a particulate, granular or fibrous rubber; and a box having the cultivation bed accommodated therein, the box being provided at an upper side thereof with a protective member having openings sufficient for the growth of sprouts, and formed at a lower side thereof with holes and downward projections for drainage and air flow.

2. A plant cultivation block as defined in claim 1 wherein the cultivation bed further contains particulate, granular or fibrous pieces of a plant and/or soil.

3. A plant cultivation block as defined in claim 1 wherein the box of one plant cultivation block is releasably coupled by an attaching member to that of another plant cultivation block as arranged adjacent thereto.

4. A plant cultivation block comprising: a box covered at an upper side thereof with a protective member having openings sufficient for the growth of sprouts and provided at a lower side thereof with a bottom plate having holes and downward projections for drainage and air flow, the bottom plate having an upper surface with an air permeable fabric affixed thereto; and a plant cultivation medium comprising a particulate, granular or fibrous rubber, along with seeds of a plant, the plant cultivation medium being stored within a space formed between the protective member and the bottom plate of the box.

5. A plant cultivation block as defined in claim 1 wherein the cultivation bed further contains particulate, granular or fibrous pieces of a plant and/or soil.

6. A plant cultivation block as defined in claim 1 wherein the box of one plant cultivation block is releasably coupled by an attaching member to that of another plant cultivation block as arranged adjacent thereto.

7. A plant cultivation block as defined in claim 4 wherein the box of one plant cultivation block is releasably coupled by an attaching member to that of another plant cultivation block as arranged adjacent thereto.

8. A plant cultivation block comprising: a box provided at an upper side thereof with a protective member having openings sufficient for the growth of sprouts and provided at a lower side thereof with a bottom plate having holes and downward projections for drainage and air flow; a lawn grass mat placed into the box with its grass side opposed to the protective member; and a plant cultivation medium comprising a particulate, granular or fibrous rubber, the medium being stored within a space formed between the grass mat and the bottom plate having an upper surface with an air permeable fabric affixed thereto.

9. A plant cultivation block as defined in claim 8 wherein the cultivation bed further contains particulate, granular or fibrous pieces of a plant and/or soil.

* * * * *